(12) United States Patent
Nanba

(10) Patent No.: US 7,023,624 B2
(45) Date of Patent: Apr. 4, 2006

(54) ZOOM LENS SYSTEM AND IMAGING APPARATUS HAVING THE SAME

(75) Inventor: Norihiro Nanba, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/915,752

(22) Filed: Aug. 10, 2004

(65) Prior Publication Data

US 2005/0046962 A1    Mar. 3, 2005

(30) Foreign Application Priority Data

Aug. 11, 2003   (JP) .............................. 2003-207162

(51) Int. Cl.
  *G02B 15/14*   (2006.01)
  *G02B 27/64*   (2006.01)

(52) U.S. Cl. ...................... 359/687; 359/557

(58) Field of Classification Search ................ 359/687, 359/554, 557
  See application file for complete search history.

(56) References Cited

U.S. PATENT DOCUMENTS

| 4,927,250 | A | 5/1990 | Suda |
| 5,039,211 | A | 8/1991 | Maruyama |
| 5,585,966 | A | 12/1996 | Suzuki |
| 6,266,189 | B1 | 7/2001 | Konno et al. |
| 6,285,502 | B1 | 9/2001 | Konno et al. |
| 6,414,800 | B1 | 7/2002 | Hamano |
| 6,462,885 | B1 * | 10/2002 | Nishio ........................ 359/687 |
| 6,473,231 | B1 | 10/2002 | Hamano et al. |
| 6,606,194 | B1 | 8/2003 | Hamano et al. |

FOREIGN PATENT DOCUMENTS

| EP | 1 103 834 A1 | 5/2001 |
| JP | 56-21133 | 2/1981 |
| JP | 61-223819 | 10/1986 |
| JP | 2-124521 | 5/1990 |
| JP | 5-60974 | 3/1993 |
| JP | 7-128619 | 5/1995 |
| JP | 7-199124 | 8/1995 |
| JP | 9-230235 | 9/1997 |
| JP | 9-230241 | 9/1997 |
| JP | 10-232420 | 9/1998 |
| JP | 10-260355 | 9/1998 |
| JP | 11-237550 | 8/1999 |
| JP | 11-344669 | 12/1999 |
| JP | 2001-66500 | 3/2001 |

* cited by examiner

*Primary Examiner*—Georgia Epps
*Assistant Examiner*—William Choi
(74) *Attorney, Agent, or Firm*—Morgan & Finnegan, LLP

(57) ABSTRACT

In a zoom lens comprising a first lens unit having positive refractive power, a second lens unit having negative refractive power, a third lens unit having positive refractive power and a fourth lens unit having positive refractive power in order from the object side to the image side, and performing zooming by changing the intervals between the lens units, the third lens unit is constituted by a first lens sub-unit and a second lens sub-unit in order from the object side to the image side, and an image formed by the zoom lens system is displaced by the movement of the second lens sub-unit so as to have a component in the direction perpendicular to the optical axis.
Moreover, the first lens sub-unit and the second lens sub-unit constituting the third lens unit are set to positive refractive power, the first lens sub-unit is constituted by a positive lens and a negative lens and the second lens sub-unit is constituted by one lens component.

17 Claims, 12 Drawing Sheets

ZOOM LENS SYSTEM AND IMAGING APPARATUS HAVING THE SAME

BACKGROUND OF THE INVENTION

1. Field of the Invention

The present invention relates to a zoom lens system and an imaging apparatus having the zoom lens system and is preferably applied to, for example, a video camera, a silver-halide film camera, and a digital still camera.

2. Description of the Related Art

On photographing an object from a mobile object such as a traveling automobile or airplane, since vibrations are propagated to a photographing system it causes that a photographed image blurs. Various types of shake correction optical systems having a shake correction function for preventing a blur of a photographed image have been proposed so far.

For example, in Japanese Patent Application Laid-Open No. S56-21133, a detection device to detect a vibration state is provided in an optical apparatus, and an image blur is corrected to stabilize an image by moving a portion of optical components of an optical system in the direction for cancelling a vibrational displacement of an image blur due to vibrations in responce to the output signal from the detection device. In Japanese Patent Application Laid-Open No. S61-223819 (corresponding to U.S. Pat. No. 4,927,250), an image blur is corrected by changing apex angles of a variable apex angle prism according to vibrations of a photographing system in which the variable apex angle prism is disposed in a position closest to an object to stabilize an image. In Japanese Patent Application Laid-Open No. H02-124521 (corresponding to U.S. Pat. No. 5,039,211), a static image is obtained by detecting vibrations of a photographing system by a detection device such as an acceleration sensor and displacing a portion of lens units of the photographing system in the direction perpendicular to the optical axis in accordance with a signal thus obtained.

In Japanese Patent Application Laid-Open No. H07-128619, in a four-unit configuration zoom lens composed of first, second, third and fourth lens units of positive, negative, positive and positive refractive powers, a static image is obtained by constituting the third lens unit by two lens sub-units of positive and negative refractive powers and displacing the lens sub-unit having positive refractive power of the two lens sub-units in the direction perpendicular to the optical axis. In Japanese Patent Application Laid-Open No. H07-199124 (corresponding to U.S. Pat. No. 5,585,966), in a four-unit configuration zoom lens composed of first, second, third and fourth lens units of positive, negative, positive and positive refractive powers, a static image is obtained by displacing the whole third lens unit in the direction perpendicular to the optical axis. In Japanese Patent Application Laid-Open No. H05-60974, in a four-unit configuration zoom lens composed of first, second, third and fourth lens units of positive, negative, positive and positive refractive powers, the whole length of lenses is shortened by using the third lens unit as the telephoto type lens constituted by a positive lens and a negative meniscus lens.

Moreover, in Japanese Patent Application Laid-Open No. 2001-66500 (corresponding to U.S. Pat. No. 6,414,800), in a four-unit configuration zoom lens composed of first, second, third and fourth lens units of positive, negative, positive and positive refractive powers, the present applicant proposes a zoom lens for obtaining a static image by displacing the whole third lens unit in the direction perpendicular to the optical axis.

Furthermore, in Japanese Patent Application Laid-Open No. H11-237550 (corresponding to U.S. Pat. No. 6,473,231 and U.S. Pat. No. 6,606,194), in a four-unit configuration zoom lens composed of first, second, third and fourth lens units of positive, negative, positive and positive refractive powers, the present applicant proposes a zoom lens for obtaining a static image by dividing the third lens unit into a lens sub-unit of negative refractive power and a lens sub-unit of positive refractive power and displacing the lens sub-unit of positive refractive power in the direction perpendicular to the optical axis.

Furthermore, in Japanese Patent Application Laid-Open No. H10-260355 (corresponding to U.S. Pat. No. 6,473,231 and U.S. Pat. No. 6,606,194), in a four-unit configuration zoom lens composed of first, second, third and fourth lens units of positive, negative, positive and positive refractive powers, the present applicant proposes a zoom lens for obtaining a static image by dividing the third lens unit into two positive lens sub-units and displacing either of them in the direction perpendicular to the optical axis.

Japanese Patent Application Laid-Open No. H11-344669 (corresponding to EPA1 1103834) discloses a zoom lens for obtaining a static image by displacing the third lens unit or fourth lens unit in the direction perpendicular to the optical axis in a five-unit configuration zoom lens composed of first to fifth lens units of positive, negative, positive, genitive and positive refractive powers or positive, negative, negative, positive and positive refractive powers.

Moreover, Japanese Patent Application Laid-Open No. H10-232420 discloses a zoom lens for obtaining a static image by constituting the third lens unit by two lenses of a positive lens and a negative lens and displacing either of the two lenses in the direction perpendicular to the optical axis in a four-unit configuration zoom lens composed of first, second, third and fourth lens units of positive, negative, positive and positive refractive powers.

Furthermore, Japanese Patent Application Laid-Open No. H09-230235 (corresponding to U.S. Pat. No. 6,266,189 and U.S. Pat. No. 6,285,502) discloses a zoom lens for obtaining a static image by constituting a zoom lens having a four-unit configuration composed of first, second, third and fourth lens units of positive, negative, positive and positive refractive powers so that the first and fourth lens units move toward the object side when zooming from a wide angle end to a telescopic end displacing one of the lenses behind the second lens unit in the direction perpendicular to the optical axis.

Furthermore, Japanese Patent Application Laid-Open No. H09-230241 (corresponding to U.S. Pat. No. 6,266,189 and U.S. Pat. No. 6,285,502) discloses a zoom lens for obtaining a static image by constituting a zoom lens having a four-unit configuration formed by first, second, third and fourth lens units of positive, negative, positive and positive refractive powers so that the first and fourth lens units move toward the object side when zooming from a wide angle end to a telescopic end, dividing any one of the lens units from the second lens unit downward into two lens sub-units and displacing either of the two lens sub-units in the direction perpendicular to the optical axis.

In general, when disposing a shake correction optical member (such as a variable apex-angle prism or movable lens unit) to the front of a photographing system, there has been a problem that the whole apparatus is increased in size and a moving mechanism for moving its variable apex-angle prism or movable lens unit becomes complex.

For example, in an optical system for having a variable apex-angle prism, for shake correction there has been a problem that the occurrence of eccentric chromatic aberration of magnification increases particularly at the long-focal-length side when performing the shake correction.

However, a method for preventing vibrations by decentering some lenses of a photographing system in the direction perpendicular to the optical axis in parallel has an advantage that a special optical system is unnecessary for shake correction. Moreover, by minimizing the configuration of lens units for shake correction, it is an advantage that it is possible to restrain the driving torque and downsize an actuator for shake correction.

From the above viewpoint, in the case of a zoom lens having a four-unit configuration composed of first, second, third and fourth lens units of positive, negative, positive and positive refractive powers among the above well-known zoom lenses, if the vibration proof is performed by moving some lenses of the third lens unit instead of the whole third lens unit in the direction perpendicular to the optical axis, the driving torque can be decreased. Particularly, it is effective to prevent vibrations by one thin lens component.

However, in Japanese Patent Application Laid-Open No. H10-260355, vibrations are prevented by driving two lenses including a lens having a comparatively large wall thickness as a shake correction lens unit. In the case of this method, the driving torque tends to increase.

In a four-unit configuration zoom lens composed of first, second, third and fourth lens units having positive, negative, positive and positive refractive powers respectively, when dividing the third lens unit into a lens sub-unit of negative refractive power and a lens sub-unit of positive refractive power, the back focus is likely to be lengthened due to the function of the lens sub-unit of negative refractive power. This is effective when inserting a color separating prism but is disadvantageous to decrease the whole lens length.

In the methods proposed in Japanese Patent Application Laid-Open Nos. H11-237550 and H10-232420, the third lens unit is divided into a lens unit of negative refractive power and a lens unit of positive refractive power and the whole lens length tends to increase due to the function of the lens unit of negative refractive power.

In Japanese Patent Application Laid-Open No. 11-344669, the third lens unit or the fourth lens unit in a five-unit configuration is a lens unit of negative refractive power. However, this is equivalent to a configuration in which the third lens unit in a four-unit configuration is divided into two lens units and either of them has negative refractive power. Therefore, the whole length tends to increase due to the function of the lens unit of negative refractive power.

In a four-unit configuration zoom lens composed of first, second, third and fourth lens units having positive, negative, positive and positive refractive powers respectively, in order to focus by the fourth lens unit it is necessary to sufficiently secure the interval between the third lens unit and fourth lens unit in the telescopic side having a large delivery distance of a lens unit. In the case of a high zooming ratio such as approx. 10, with the fourth lens unit having reciprocated locus being convex to the object side, a preferable space efficiency is obtained by securing a delivery space when focusing on infinite objects at the telescopic side in comparison with the case focusing on close-range objects. Therefore, it is easy to cope with both to obtain a high zooming ratio and to downsize the zoom lens.

However, in Japanese Patent Application Laid-Open Nos. H09-230241 and H09-230235, the fourth lens unit moves toward the object side from the wide angle end toward the telescopic end to decrease the interval with the third lens unit. Therefore, to secure the interval for the fourth lens unit to be delivered at the telescopic end, the whole length increases. Therefore, in the case of this method, it is difficult to cope with both rear focusing and decrease of the whole lens length.

SUMMARY OF THE INVENTION

It is an object of the present invention to provide a zoom lens system having a new configuration making it possible to downsize and easily drive an image-blur correcting lens unit.

To achieve the above object, a zoom lens system of an illustrative aspect of the present invention is as follows:

In a zoom lens system having a first lens unit of positive refractive power (optical power=reciprocal of focal length), second lens unit of negative refractive power, third lens unit of positive refractive power, and fourth lens unit of positive refractive power from the object side to the image side in order and performing zooming by changing intervals between each lens units, the third lens unit is constituted by a first lens sub-unit and a second lens sub-unit from the object side to the image side in order to displace an image formed by the zoom lens system by moving the second lens sub-unit so as to have a component in the direction perpendicular to the optical axis.

Moreover, the first lens sub-unit and the second lens sub-unit constituting the third lens unit are provided with positive optical power, the first lens sub-unit is constituted by a positive lens element and a negative lens element, and the second lens sub-unit is constituted so as to include one lens component.

Or, the first lens sub-unit has a plurality of lens elements and an aperture stop disposed on the image side of the lens element closest to the object side among the plurality of lens elements.

DETAILED DESCRIPTION OF THE PREFERRED EMBODIMENTS

Embodiments of a zoom lens system and an imaging apparatus of the present invention are described below by referring to the accompanying drawings.

Figure 1:
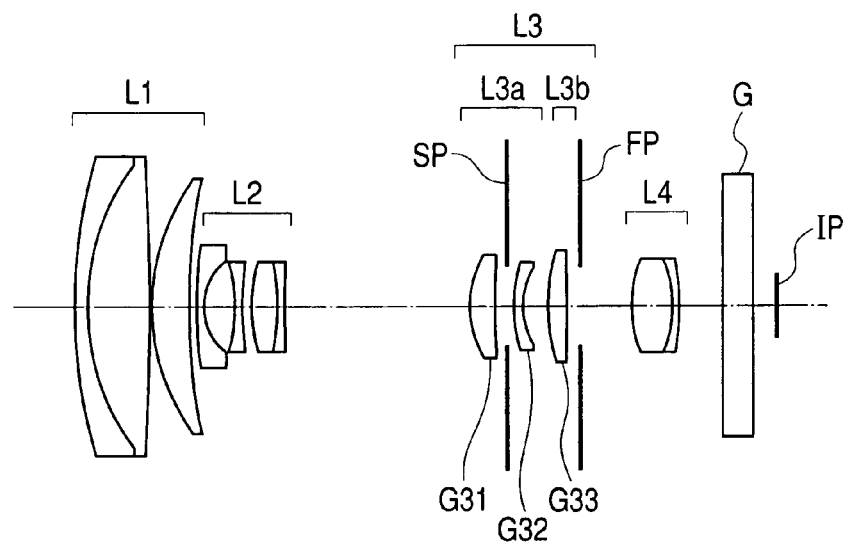
FIG. 1 is a sectional view of a zoom lens of embodiment 1.
Figure 2A:
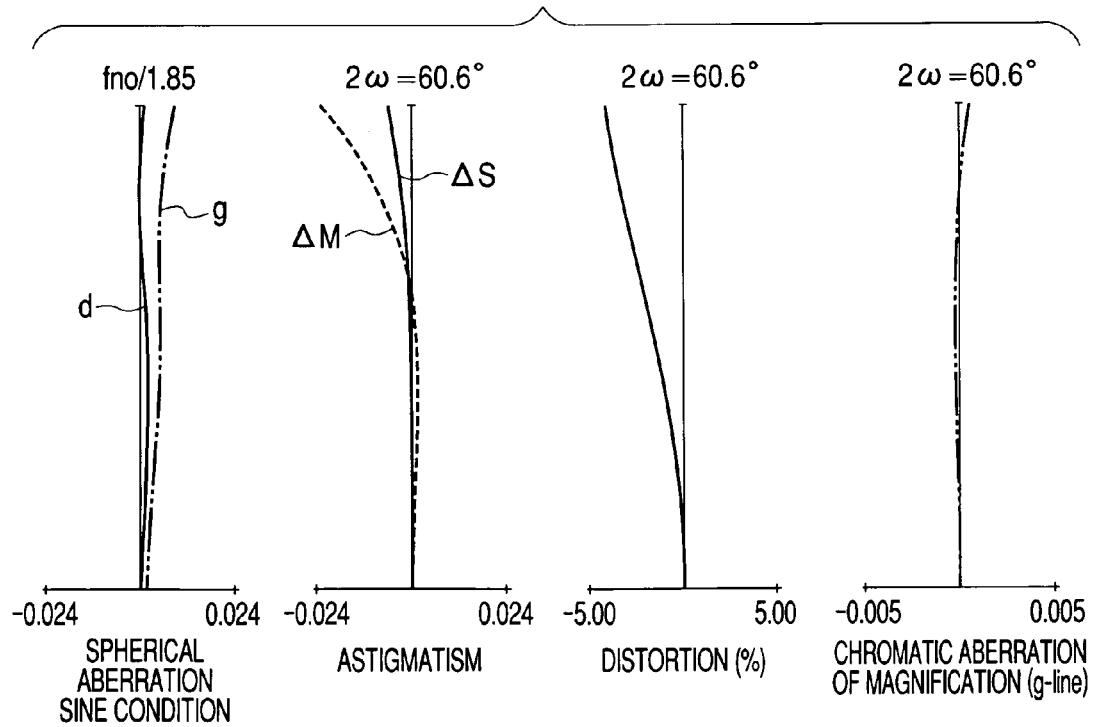
FIGS. 2A, 2B and 2C are aberration graphs of the zoom lens of the embodiment 1.
Figure 2B:
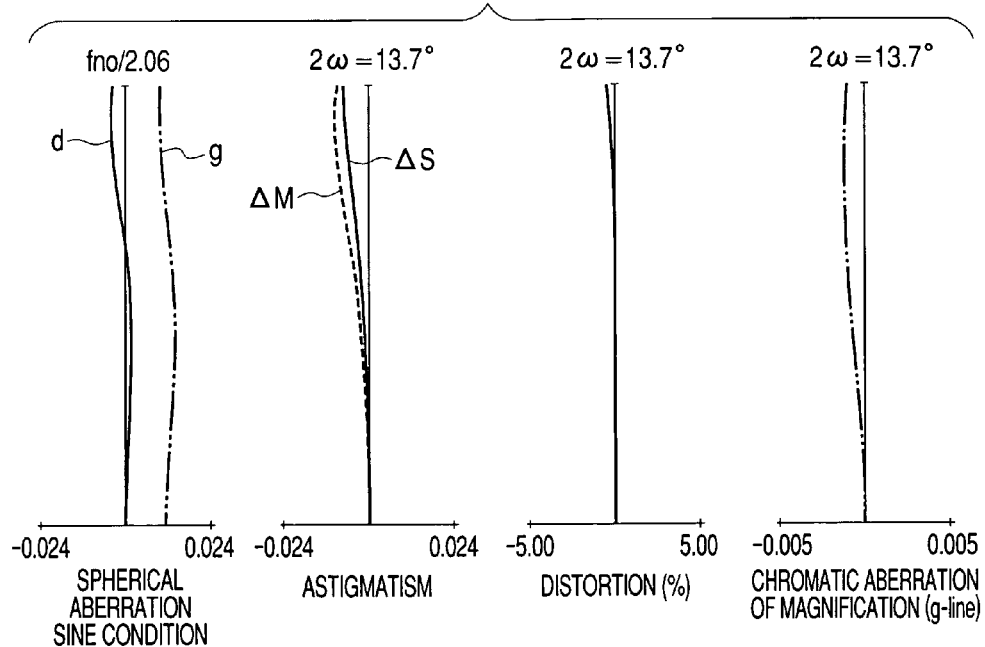
Figure 2C:
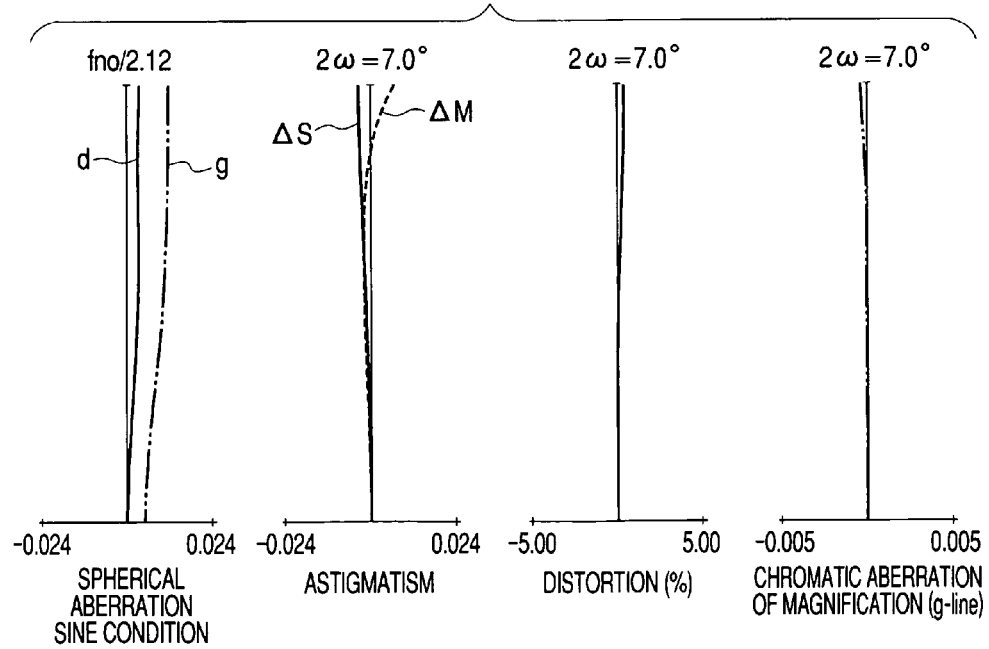

FIG. 1 is a sectional view of the zoom lens of the embodiment 1 at the wide angle end and FIGS. 2A, 2B and 2C are aberration graphs of the zoom lens of the embodiment 1 at the wide angle end, intermediate zooming position and telescopic end.

Figure 3:
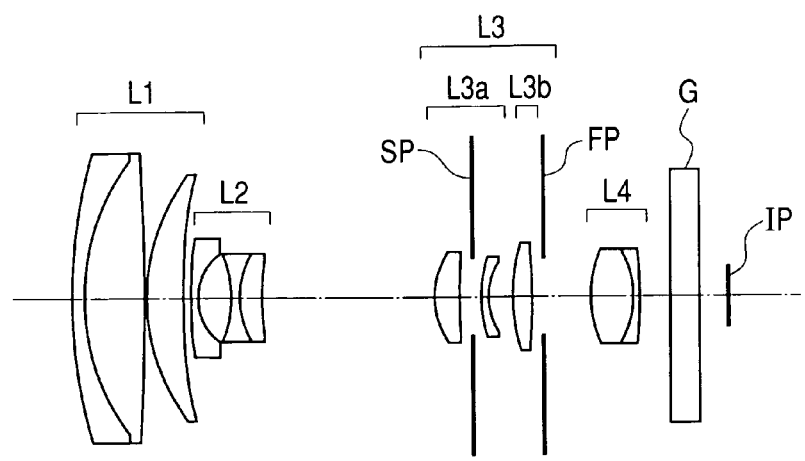
FIG. 3 is a sectional view of a zoom lens of embodiment 2.
Figure 4A:
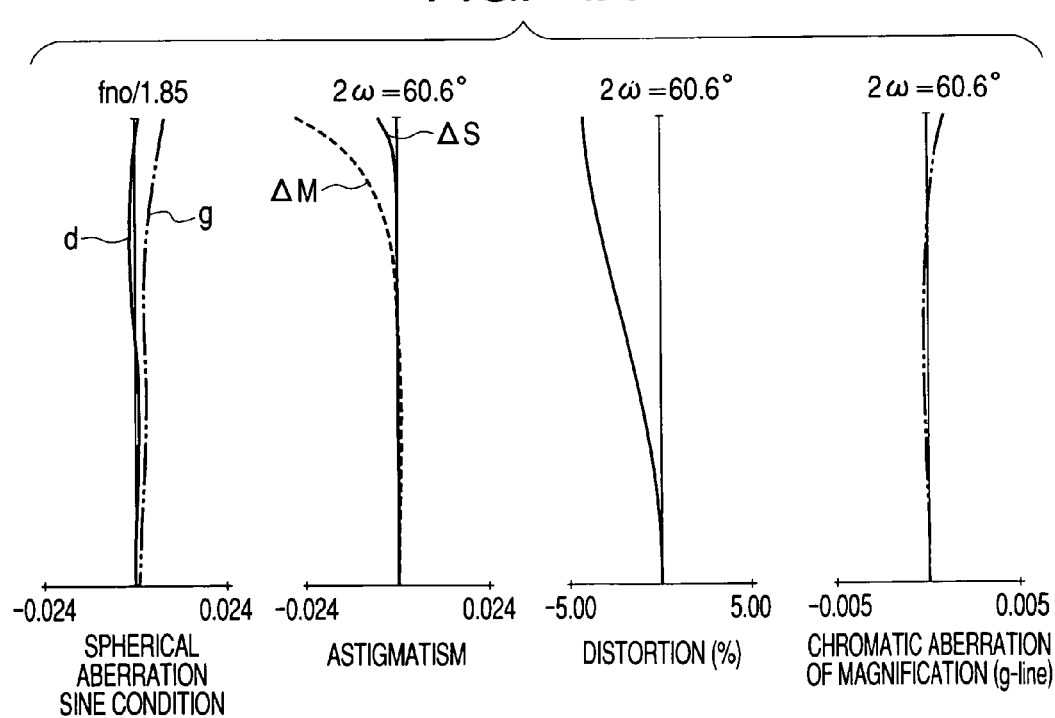
FIGS. 4A, 4B and 4C are aberration graphs of the zoom lens of the embodiment 2.
Figure 4B:
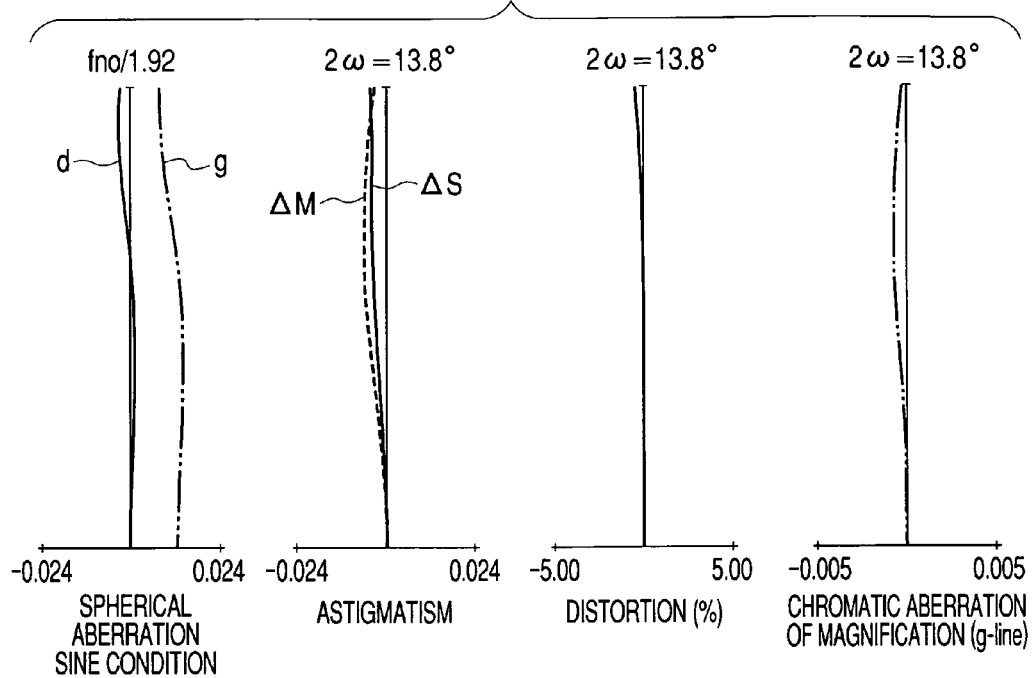
Figure 4C:
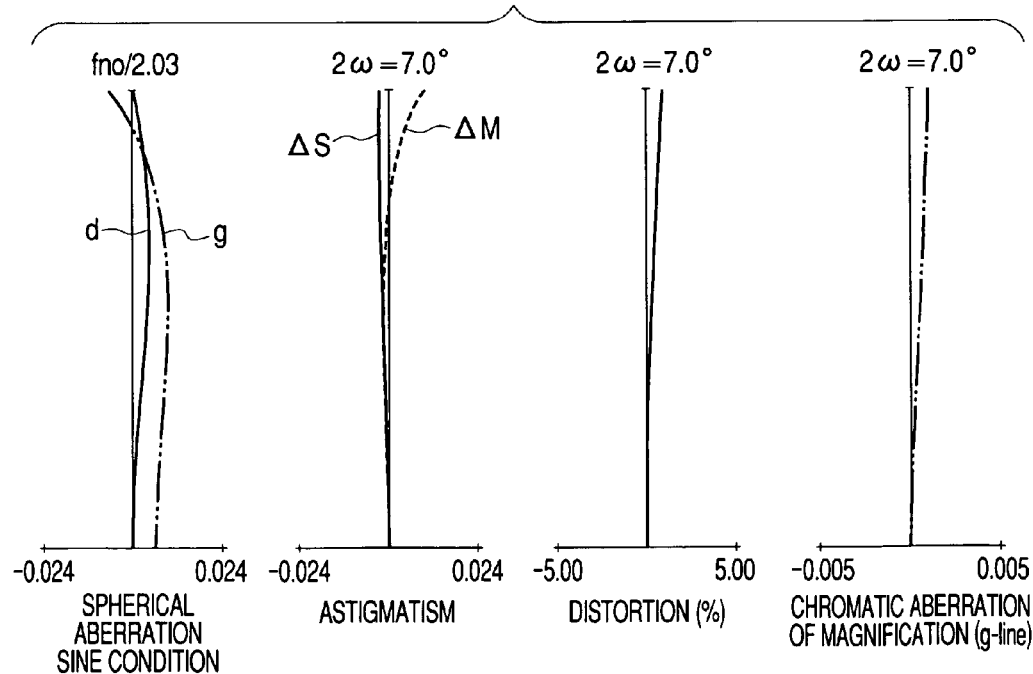

FIG. 3 is a sectional view of the zoom lens of the embodiment 2 at the wide angle end and FIGS. 4A, 4B and 4C are aberration graphs of the zoom lens of the embodiment 2 at the wide angle end, intermediate zooming position and telescopic end.

Figure 5:
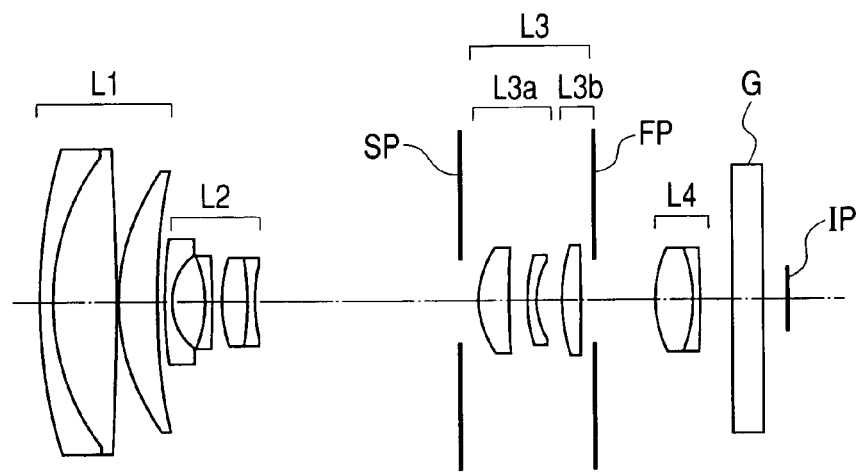
FIG. 5 is a sectional view of a zoom lens of embodiment 3.
Figure 6A:
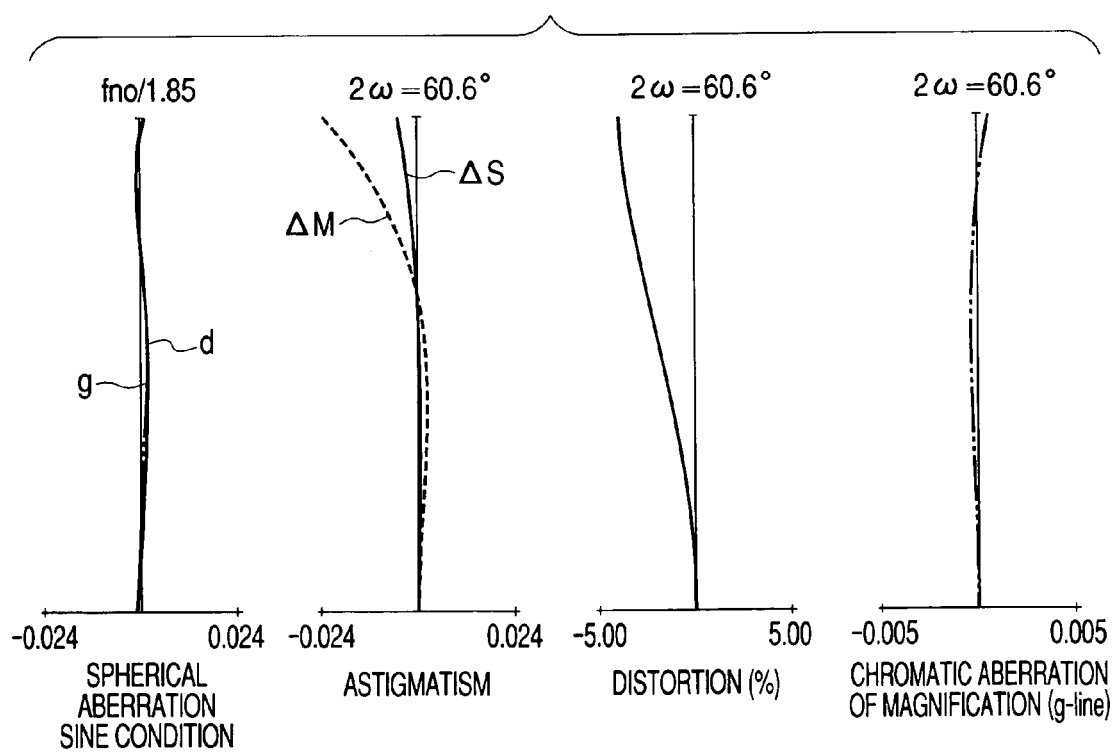
FIGS. 6A, 6B and 6C are aberration graphs of the zoom lens of the embodiment 3.
Figure 6B:
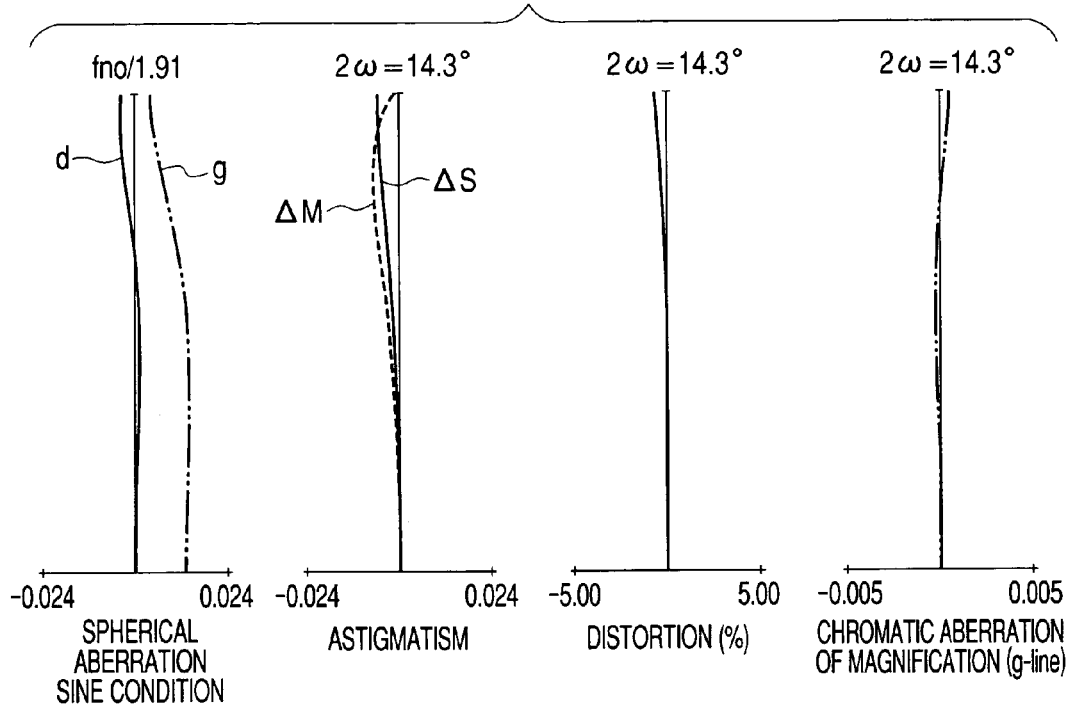
Figure 6C:
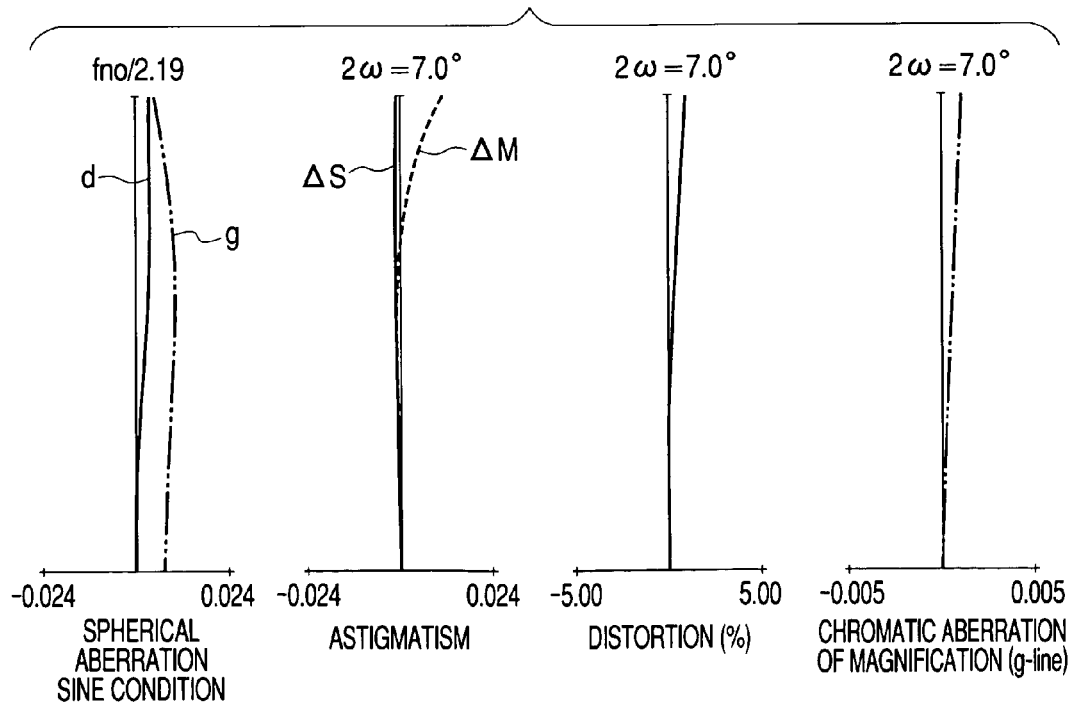

FIG. 5 is a sectional view of the zoom lens of the embodiment 3 at the wide angle end and FIGS. 6A, 6B and 6C are aberration graphs of the zoom lens of the embodiment 3 at the wide angle end, intermediate zooming position and telescopic end.

Figure 7:
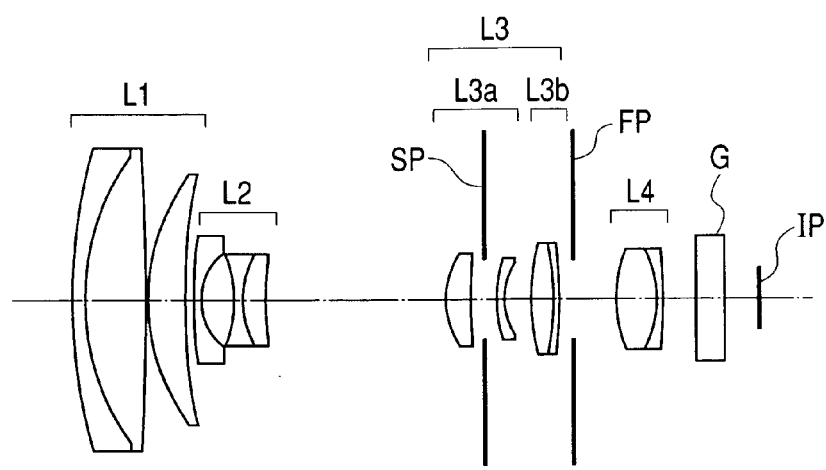
FIG. 7 is a sectional view-of a zoom lens of embodiment 4.
Figure 8A:
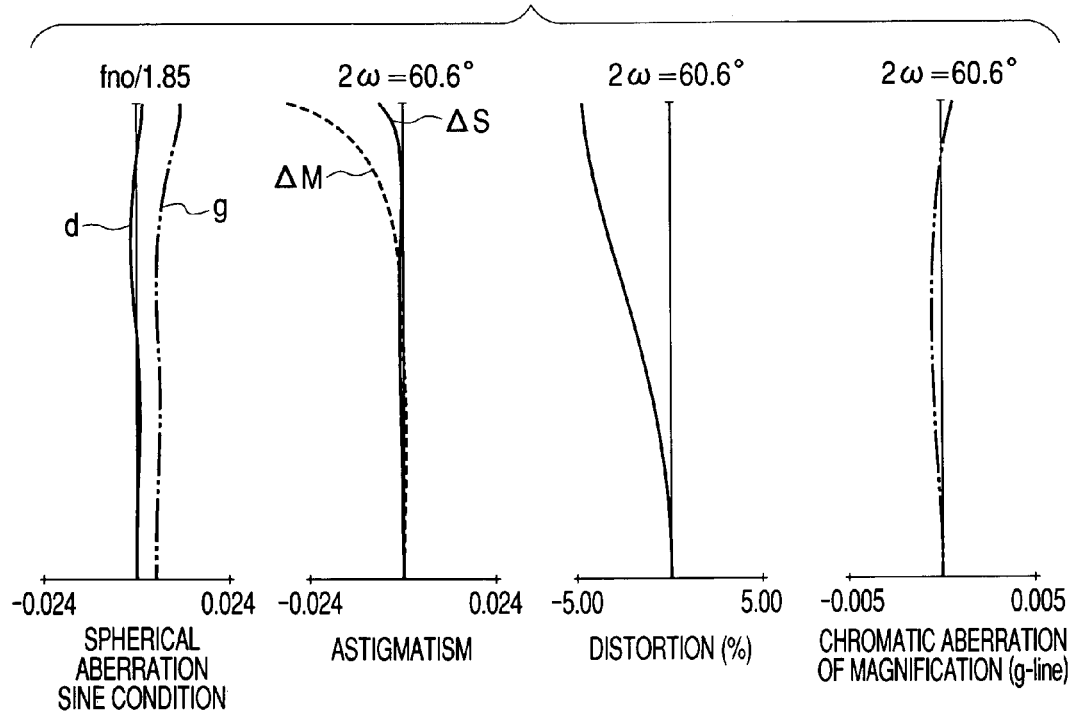
FIGS. 8A, 8B and 8C are aberration graphs of the zoom lens of the embodiment 4.
Figure 8B:
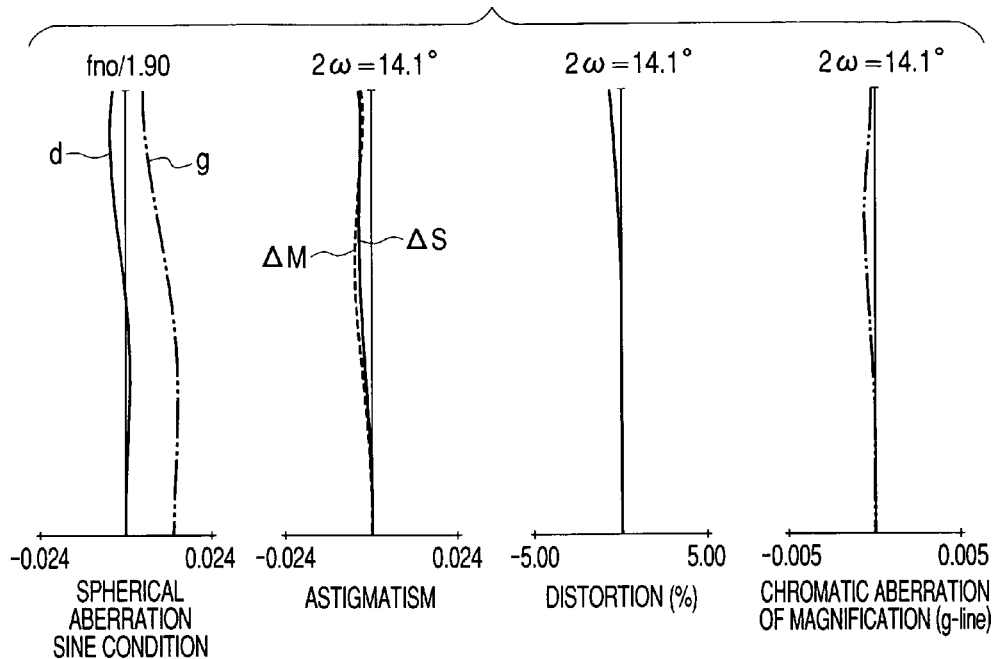
Figure 8C:
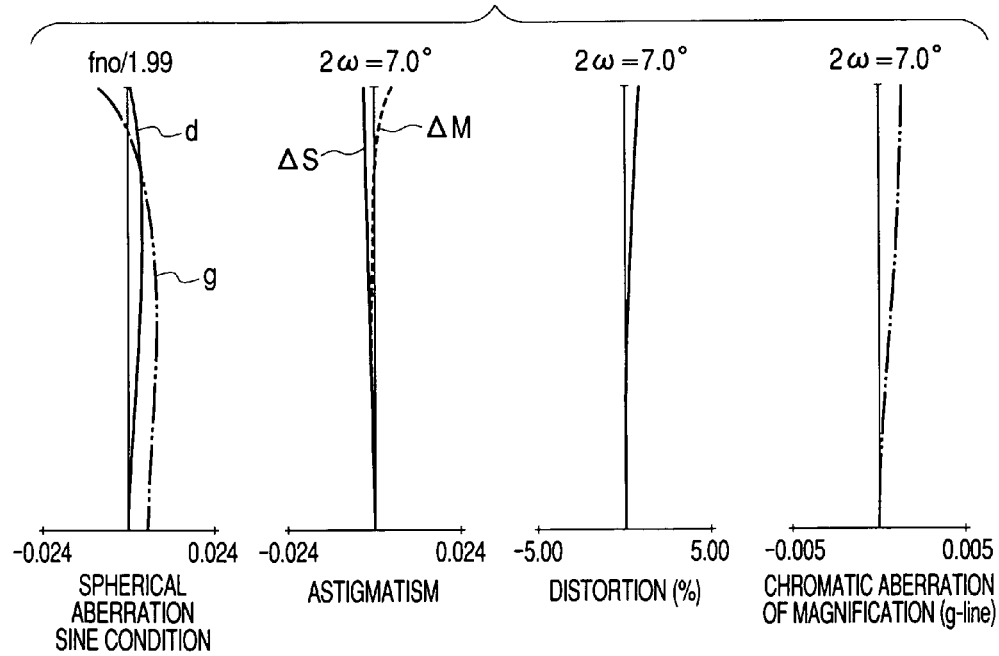

FIG. 7 is a sectional view of the zoom lens of the embodiment 4 at the wide angle end and FIGS. 8A, 8B and 8C are aberration graphs of the zoom lens of the embodiment 4 at the wide angle end, intermediate zooming position and telescopic end.

Figure 9:
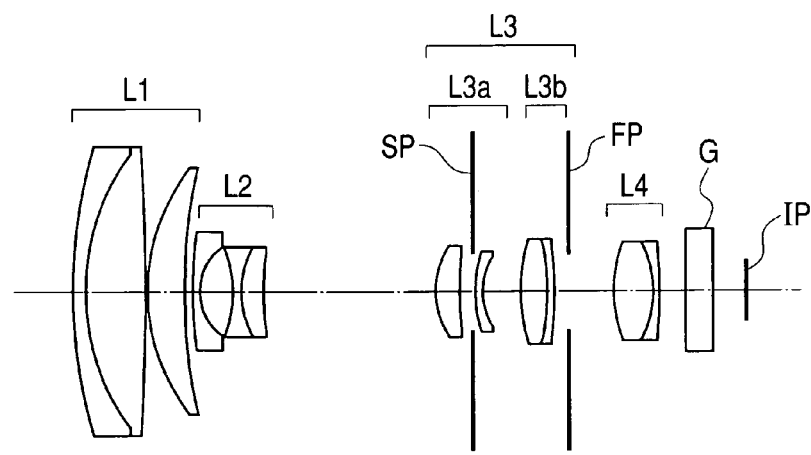
FIG. 9 is an sectional view of a zoom lens of embodiment 5.
Figure 10A:
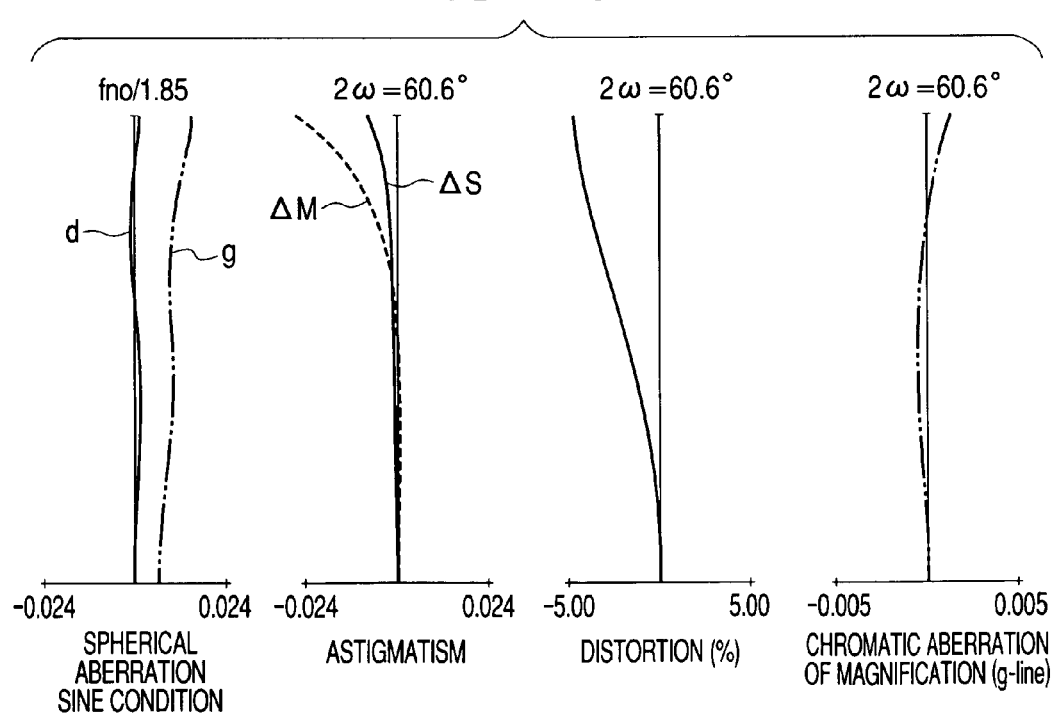
FIGS. 10A, 10B and 10C are aberration graphs of a zoom lens of embodiment 5.
Figure 10B:
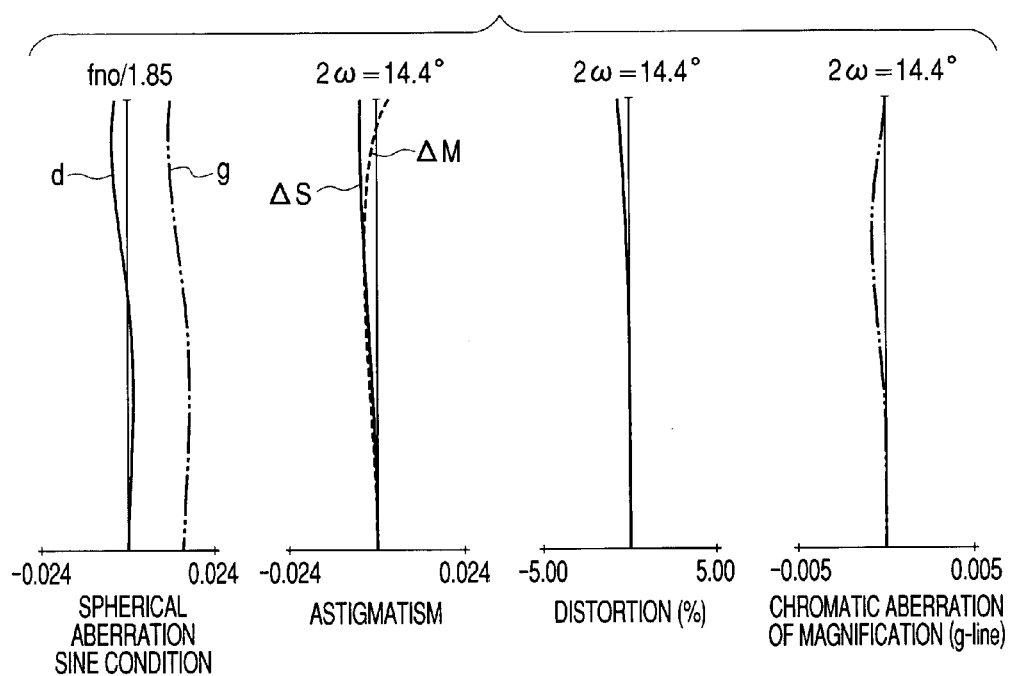
Figure 10C:
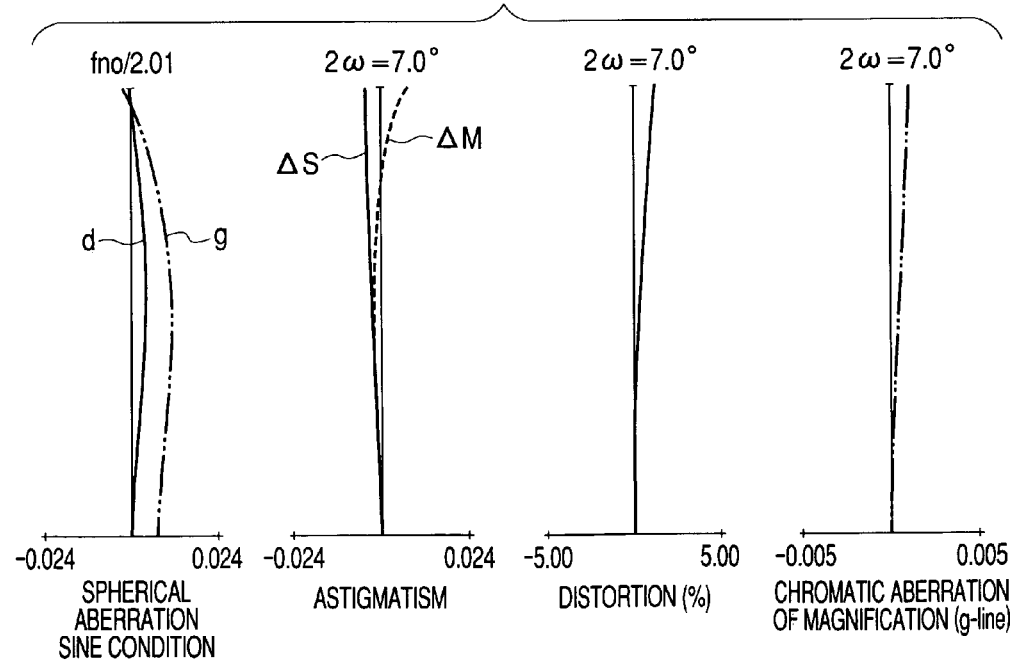

FIG. 9 is a sectional view of the zoom lens of the embodiment 5 at the wide angle end and FIGS. 10A, 10B and 10C are aberration graphs of the zoom lens of the embodiment 5 at the wide angle end, intermediate zooming position and telescopic end.

Figure 11:
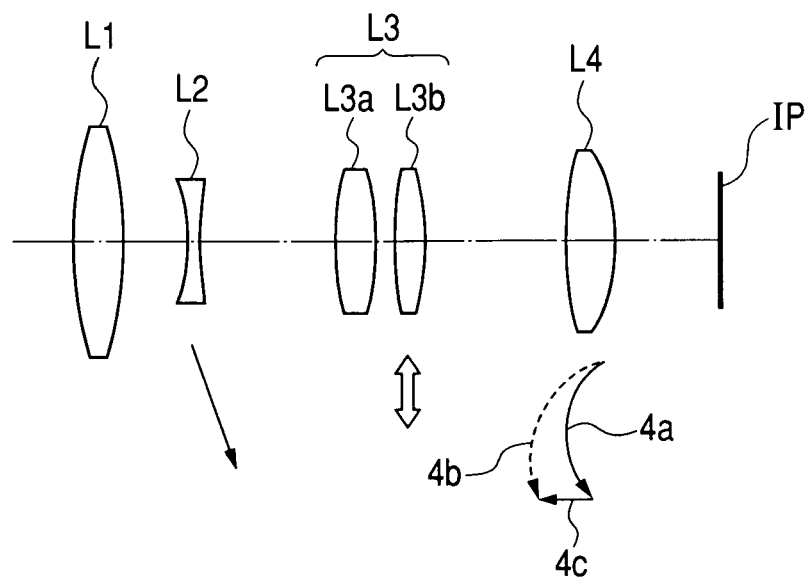
FIG. 11 is a schematic view of a paraxial refractive power arrangement of the zoom lenses of the embodiments 1 to 5.

FIG. 11 is a drawing showing a paraxial refractive power arrangement of the zoom lenses of the embodiments.

FIGS. 12A, 12B, 12C and 12D are illustrations of an principle of a shake correction system.

The zoom lens of each embodiment is a photographing lens system used for imaging apparatuses such as a video camera and digital still camera. In a lens sectional view, the left side is the object side (front) and the right side is the image side (rear).

In lens sectional views of FIGS. 1, 3, 5, 7 and 9 and the schematic view of the paraxial refractive power arrangement of FIG. 11, L1 denotes a first lens unit of positive refractive power (optical power=reciprocal of focal length), L2 denotes a second lens unit of negative refractive power, L3 denotes a third lens unit of positive refractive power and L4 denotes a fourth lens unit of positive refractive power.

The third lens unit L3 has a first lens sub-unit of positive refractive power L3a and a second lens sub-unit L3b of positive refractive power movable in the direction perpendicular to the optical axis for shake correction. Oscillation (rotational movement) with respect to a certain point on the optical axis as a rotational center is also allowed as movement for shake correction. That is, by moving a lens portion for shake correction so as to have a component in the direction perpendicular to the optical axis, movement of an image formed by a zoom lens in an image plane is realized.

Symbol IP denotes an image plane on which the photosensitive surface of a solid-state imaging device (photoelectric transducer) such as a CCD sensor or a CMOS sensor or silver-halide film is set. Symbol SP denotes an aperture stop (diaphragm) which is dispose in the first lens sub-unit L3a or between the second lens unit L2 and third lens unit L3. Symbol FP denotes a flare-cut stop which is disposed to the image side of the second lens sub-unit L3b.

In an aberration graphs, symbol d denotes a d-line, g denotes a g-line, ΔM denotes a meridional image plane, ΔS denotes a sagittal image plane and a chromatic aberration of magnification is shown by the g-line.

In the case of each embodiment, the second lens unit L2 is moved toward the image side to vary magnification as shown by an arrow in FIG. 11 for zooming from the wide angle end to the telescopic end and an image fluctuation due to the magnification variation is corrected by moving the fourth lens unit L4 while having a part of a locus convex to the object side.

Moreover, the rear focusing system is adopted which performs focusing by moving the fourth lens unit L4 on the optical axis. In FIG. 11, the curved solid line 4a and the curved dotted line 4b of the fourth lens unit L4 are locuses of the lens movement for correcting an image plane fluctuation during zooming from the wide angle end to the telescopic end when focused on an infinite object and a close-range object respectively. By performing the movement of the fourth lens unit L4 along a locus convex to the object side, the space between the third lens unit L3 and the fourth lens unit L4 is effectively used and reduction of the whole lens length is effectively achieved. The first lens unit L1 and the third lens unit L3 are not moved during zooming and focusing.

When performing focusing from an infinite object to a close-range object in the telescopic end of each embodiment, the fourth lens unit L4 is delivered onward as shown by the arrow 4c in FIG. 11. Because the aperture stop SP is integrated with the first lens sub-unit L3a, it does not move to zoom.

In the case of each embodiment, an image blur when the whole optical system vibrates is corrected by moving the second lens sub-unit L3b so as to have a component in the direction perpendicular to the optical axis. Thereby, shake correction is performed without newly adding an optical member such as a variable-apex-angle prism or a lens unit for shake correction to prevent the whole optical system from increasing in size.

Moreover, the second lens sub-unit L3b is constituted by one lens component comprising a single lens or a set of cemented lenses to decrease a correction lens unit for blur correction in size and weight by minimizing the configuration of the correction lens unit. Thereby, because it is possible to decrease an actuator for driving the correction lens unit in size, it is possible to decrease the whole system in size and the power for driving is saved.

Then, the optical principle of a shake correction system for correcting a blur of a photographed image by moving a lens unit so as to have a component in the direction perpendicular to the optical axis is described below by referring to FIG. 12.

Figure 12A:
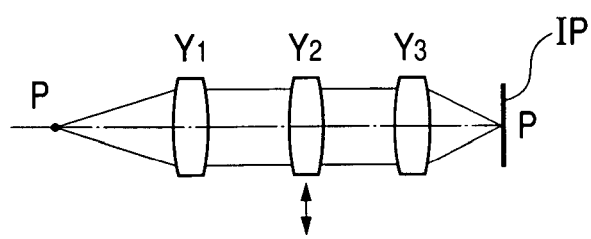
FIGS. 12A, 12B, 12C and 12D are illustrations of optical principle of shake correction.
Figure 12B:
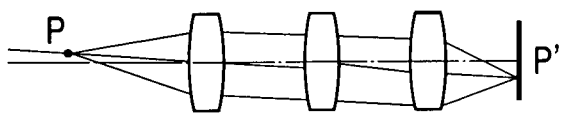
Figure 12C:
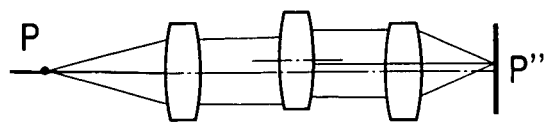
Figure 12D:
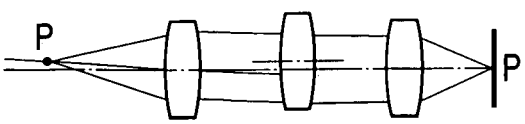

As shown in FIG. 12A, in the order from the object point P, an optical system is constituted by three lens units such as a fixed unit (fixed lens unit) Y1, eccentric unit (eccentric lens unit, shift unit) Y2 and fixed unit (fixed lens unit) Y3 and an object point P on the optical axis La sufficiently separate from the optical system would be imaged at the center of an image plane IP as an image point p. Assuming that the whole optical system including the image plane IP instantaneously tilts due to a shake of the system as shown in FIG. 12B, the object point P also instantaneously moves to an image point P' to cause a blurred image. However, by moving the eccentric unit Y2 in the direction perpendicular to the optical axis La, the image point p moves to a point p" as shown in FIG. 12C and the amount and the direction of the movement depend on the refractive power arrangement of the optical system and are shown as the eccentric sensitivity of the lens unit. Therefore, in FIG. 12B, by moving the eccentric unit Y2 in the direction perpendicular to the optical axis by a proper distance and thereby returning the image point p' shifted due to the shake of the system to the original imaged position p, hand-movement correction, that is, shake correction is performed as shown in FIG. 12D.

The moving distance Δ is provided by the following expression, $$\Delta = f \cdot \tan(\theta)/TS$$

where Δ represents a moving distance (shift distance) of the eccentric unit Y2 necessary to correct the optical axis by θ°, f represents the focal length of the whole optical system and the TS represents eccentric sensitivity of the eccentric unit Y2.

When the eccentric sensitivity TS of the eccentric unit Y2 is too large, the moving distance Δ becomes a small value and the moving distance of the shift unit Y2 necessary for shake correction can be decreased. However, since the control for proper shake correction becomes difficult, a correction remainder is produced. Particularly, in the case of a video camera or digital still camera, since the image size of an imaging device such as a CCD sensor is smaller than that of a silver-halide film and the focal length to the same field angle is short, the shift distance Δ of the eccentric unit Y2 for correcting the same field angle is decreased. Therefore, when a mechanical accuracy is the same, a correction remainder on a screen is relatively increased.

However, when the eccentric sensitivity TS is too small, the moving distance of the eccentric unit Y2 necessary for control is increased and a driving device such as an actuator for driving the eccentric unit Y2 is increased in size.

In the case of each embodiment, by setting the refractive power arrangement of each lens unit to a proper value, a zoom lens is realized in which the eccentric sensitivity TS of the second lens sub-unit L3b is a proper value, shake correction remainder due to a mechanical control error is small, and a load of a driving device such as an actuator is small.

Then, features of the lens configuration of each embodiment are described below.

In the case of each embodiment, in the order from the object side to the image side, the third lens unit L3 is constituted by a positive lens G31 having a convex surface in the object side, a negative meniscus lens G32 having a concave surface facing the object side and a positive lens G33 constituted by a single or cemented lens. By setting the negative meniscus lens G32 having a concave facing the image side in the third lens unit L3, the whole third lens unit L3 is provided as a telephoto-configuration, the principal point interval between the second lens unit L2 and third lens unit L3 is shortend, and reduction of the whole lens length is achieved.

The first lens sub-unit L3a is constituted by the positive lens G31 and negative lens G32 and the second lens sub-unit L3b is constituted by one lens component of the positive lens G33. Moreover, blur correction is performed by displacing the second lens sub-unit L3b so as to have a component in the direction perpendicular to the optical axis. To sufficiently decrease the fluctuation of chromatic aberration caused by the blur correction, it is preferable to decrease the occurrence quantity of chromatic aberration of the second lens sub-unit L3b. In the case of each embodiment, a chromatic aberration fluctuation for shake correction is restrained to a level having no problem by using a low-dispersion glass material while securing a sensitivity necessary for shake correction by setting the refractive power of the second lens sub-unit L3b to an optimum value.

Moreover, it is preferable to constitute the second lens sub-unit L3b by a set of cemented lenses comprising a positive lens and a negative lens in aberration correction. Thus, since chromatic aberration correction of the second lens sub-unit L3b becomes easy while increasing the refractive power of the second lens sub-unit L3b, it becomes easy both to raise the sensitivity for shake correction and to restrain chromatic aberration fluctuation caused by the shake correction.

Moreover, an aspherical surface having a shape in which a convergence feature is weakened from the optical axis to the peripheral is formed on the second lens sub-unit L3b. Thereby, the aberration fluctuation for shake correction is decreased.

Further, by forming the object side surface of the positive lens G31 into an aspherical shape, the spherical aberration generated by the third lens unit L3 is restrained and eccentric coma aberration caused by shake correction is decreased. Furthermore, by also forming the image side surface of the positive lens G31 into an aspherical surface, it is easy to correct high-order spherical aberration and eccentric coma aberration and it is possible to realize a larger-aperture zoom lens.

Further, when setting the aperture stop SP in the first lens sub-unit L3a, it is possible to decrease the distance between the second lens unit L2 and the third lens unit L3 at the telescopic end compared to the case of setting the aperture stop SP to the object side of the third lens unit L3, and this is effective to decrease the whole length. Furthermore, the portion of the aperture stop SP closer to the second lens sub-unit L3b which vibrates for shake correction can decrease a change of peripheral light quantities during shake correction. A preferable imaging performance is also obtained if setting the aperture stop SP between the second lens unit L2 and the first lens sub-unit L3a.

When constituting the second lens sub-unit L3b by a single lens, assuming the Abbe number of the material of the single lens as v3b, when constituting the second lens sub-unit L3b by a cemented lens and assuming the synthetic wall thickness of the cemented lens (distance from the apex of the lens surface closest to the object side to the apex closest to the image side, thickness on the optical axis) as D3b, the focal length of the third lens unit L3 as f3, focal lengths of the first lens sub-unit L3a and second lens sub-unit L3b as f3a and f3b, the whole focal length at the wide angle end as fw and the distance on the optical axis between the lens surface of the first lens sub-unit L3a closest to the image side and the lens surface of the second lens sub-unit L3b closest to the image side as L3ab, one or more conditional expressions are satisfied among the following five conditional expressions. If any one of these conditional expressions is satisfied, the effects corresponding to the conditional expression may be achieved as described below.

$$63 < v3b \tag{1}$$

$$0.1 < D3b/f3 < 0.3 \tag{2}$$

$$0.6 < f3b/f3a < 1.4 \tag{3}$$

$$3.0 < f3/fw < 4.0 \tag{4}$$

$$0.1 < L3ab/f3 < 0.3 \tag{5}$$

Then, the technical meaning of the above conditional expressions is described below.

The conditional expression (1) specifies the Abbe number of a material of which a single lens is made when constituting the second lens sub-unit L3b by the single lens. When the Abbe number is smaller than the lower limit of the conditional expression (1), this is not preferable because color dispersion becomes excessively large and the fluctuation of chromatic aberration for shake correction is increased.

The conditional expression (2) specifies a synthetic wall thickness when constituting the second lens sub-unit L3b by a cemented lens. To minimize the synthetic wall thickness while securing a manufacturable edge dimension, the curvature of a cemented surface is moderated. When the synthetic wall thickness is smaller than the lower limit of the conditional expression (2), that is, when the curvature of the cemented surface is too moderated, the effect of using the cemented lens for chromatic aberration correction is decreased. Therefore, the chromatic aberration fluctuation for shake correction is increased. Moreover, when the synthetic wall thickness is larger than the upper limit of the conditional expression (2), this is not preferable because the second lens sub-unit L3b is increased in size and thereby, an actuator for blur correction is increased in size and the power consumption is also increased.

The conditional expression (3) specifies the refractive power allocation of two lens units when dividing the third lens unit L3 into two lens sub-units L3a and L3b. When the focal length of the second lens sub-unit L3b is too small compared to the focal length of the first lens sub-unit L3a by exceeding the lower limit of the conditional expression (3), that is, when the refractive power of the second lens sub-unit L3b is excessively strong compared to the refractive power of the first lens sub-unit L3a, the aberration fluctuation when driving the second lens sub-unit L3b so as to have a component perpendicular to the optical axis for the shake correction, is increased and this is not preferable particularly because a central coma aberration at the time of eccentricity and field tilt occur. Moreover, when the focal length f3b of the second lens sub-unit L3b is too large compared to the focal length of the first lens sub-unit L3a by exceeding the upper limit, that is, the refractive power of the second lens sub-unit L3b is too weak compared to the refractive power of the first lens sub-unit L3a, this is not preferable because the eccentric sensitivity TS of the second lens sub-unit L3b becomes too small and the eccentric amount of the second lens sub-unit L3b necessary to correct a desired blur amount is increased to cause a blur correction unit to increase in size.

The conditional expression (4) is an expression for specifying the focal length f3 of the third lens unit L3. When the focal length f3 of the third lens unit L3 is shorter than the lower limit of the expression (4), this is not preferable because the interval between the third lens unit L3 and the fourth lens unit L4 is excessively decreased and a moving space necessary for the fourth lens unit L4 to perform zooming or focusing cannot be secured. Moreover, when the focal length f3 of the third lens unit L3 is longer than the upper limit of the conditional expression (4), this is not preferable in downsizing because the distance from the aperture stop to an image plane is increased.

The conditional expression (5) specifies the interval L3ab between the first lens sub-unit L3a and the second lens sub-unit L3b. When the interval L3ab is shorter than the lower limit, an interference tends to easily occurs between holding members of the first lens sub-unit L3a and second lens sub-unit L3b when the second lens sub-unit L3b moves so as to have a component in the direction perpendicular to the optical axis for blur correction. Particularly, when forming the lens surface of the first lens sub-unit L3a closest to the image side into a concave surface facing the image side, it is preferable that the value, L3ab/f3, is not lower than the lower limit. When the interval between the first lens sub-unit L3a and the second lens sub-unit L3b is longer than the upper limit, this is not preferable because the interval between the second lens sub-unit L3b and the fourth lens unit L4 becomes too short and a moving space necessary for the fourth lens unit L4 to perform zooming or focusing cannot be secured.

It is more preferable that the above conditional expression (1) satisfies the following conditional expression (1a).

$$68 < v3b < 75 \qquad (1a)$$

The condition (1a) is obtained by narrowing the range of the conditional expression (1). If the value, v3b, is larger than the lower limit of the conditional expression (1a), there is an effect for decreasing the fluctuation of the chromatic aberration when performing blur correction caused by shake by the second lens sub-unit L3b because a material is restricted to a glass material having a lower dispersion. When exceeding the upper limit of the conditional expression (1a), this is not preferable because it is difficult to manufacture a glass material because the material is generally an abnormal dispersion glass material.

In the case of each embodiment, it is more preferable to set numerical ranges of the conditional expressions (2) to (5) as follows.

$$0.12 < D3b/f3 < 0.25 \qquad (2a)$$

$$0.7 < f3b/f3a < 1.3 \qquad (3a)$$

$$3.2 < f3/fw < 3.8 \qquad (4a)$$

$$0.12 < L3ab/f3 < 0.25 \qquad (5a)$$

Moreover, in the case of each embodiment, it is preferable to use the following configurations.

It is preferable to relatively increase a peripheral light quantity by decrease an aperture stop diameter at the telescopic side and restricting the central beam at the time of zooming in order to decrease a change of light quantities caused by shake correction.

It is preferable to increase a lens diameter corresponding to the movement of the second lens sub-unit L3b for shake correction. Therefore, to prevent an extra on-axis beam from coming in, it is preferable to dispose a fixed flare-cut stop FP in the object side or in the image plane side of the second lens sub-unit L3b. By disposing the fixed flare-cut stop FP between the second lens sub-unit L3b and the fourth lens unit L4, it is possible to prevent unnecessary beam from coming in while effectively using a space.

Then, numerical data values for numerical embodiments 1 to 5 corresponding to the embodiments 1 to 5 respectively are shown. In the case of each numerical embodiment, symbol i denotes the sequence of optical surface from the object side, Ri denotes a curvature radius of the i-th optical surface (i-th surface), Di denotes the interval between the i-th surface and the (i+1)-th face and Ni and vi denote the refractive index and Abbe number of the i-th optical member on the basis of d-line respectively. Symbol f denotes a focal length, Fno denotes F number and ω denotes a half field angle. Moreover, two surfaces closest to the image side in each numerical embodiment are surfaces constituting a glass block G. Further, an aspherical shape is shown by the following expression, $$X = \frac{(1/R)H^2}{1+\sqrt{1-(1+k)(H/R)^2}} + A'H^3 + BH^4 + B'H^5 + CH^6 + C'H^7 + DH^8 + D'H^9 + EH^{10}$$

where k represents a conic constant, B, C, D, E, A', B', C' and D' represent aspherical coefficients and X represents the optical-axis-directional displacement at the position of the height H from the optical axis on the basis of a surface vertex.

In this case, R denotes a paraxial curvature radius. Moreover, the indication of "e-Z" in the numerical value of an aspherical coefficient denotes "$10^{-Z}$". Further, Table 1 shows the correspondence with the above conditional expressions in each numerical embodiment.

(Numerical Embodiment 1)

| f = 1~9.57 | Fno = 1.85~2.12 | 2ω = 60.6°~7.0° | |
|---|---|---|---|
| R1 = 10.106 | D1 = 0.24 | N1 = 1.846660 | ν1 = 23.9 |
| R2 = 4.553 | D2 = 1.15 | N2 = 1.603112 | ν2 = 60.6 |
| R3 = −37.625 | D3 = 0.04 | | |
| R4 = 4.041 | D4 = 0.68 | N3 = 1.772499 | ν3 = 49.6 |
| R5 = 11.869 | D5 = Variable | | |
| R6 = 11.248 | D6 = 0.14 | N4 = 1.834807 | ν4 = 42.7 |
| R7 = 1.174 | D7 = 0.55 | | |
| R8 = −3.018 | D8 = 0.12 | N5 = 1.804000 | ν5 = 46.6 |
| R9 = 5.244 | D9 = 0.18 | | |
| R10 = 3.052 | D10 = 0.48 | N6 = 1.846660 | ν6 = 23.9 |
| R11 = −3.775 | D11 = 0.12 | N7 = 1.834807 | ν7 = 42.7 |
| R12 = 17.868 | D12 = Variable | | |
| R13 = 1.668 | D13 = 0.48 | N8 = 1.693500 | ν8 = 53.2 |
| R14 = 16.532 | D14 = 0.24 | | |
| R15 = Stop | D15 = 0.13 | | |
| R16 = 2.764 | D16 = 0.14 | N9 = 1.846660 | ν9 = 23.9 |
| R17 = 1.391 | D17 = 0.48 | | |
| R18 = 3.460 | D18 = 0.36 | N10 = 1.487490 | ν10 = 70.2 |
| R19 = −15.631 | D19 = 0.24 | | |
| R20 = Flare-cut stop | D20 = Variable | | |
| R21 = 2.577 | D21 = 0.77 | N11 = 1.696797 | ν11 = 55.5 |
| R22 = −1.908 | D22 = 0.12 | N12 = 1.846660 | ν12 = 23.9 |
| R23 = −6.470 | D23 = 0.80 | | |
| R24 = ∞ | D24 = 0.54 | N13 = 1.516330 | ν13 = 64.1 |
| R25 = ∞ | | | |

| Variable | Focal length | | |
|---|---|---|---|
| interval | 1.00 | 4.46 | 9.57 |
| D5 | 0.14 | 2.64 | 3.34 |
| D12 | 3.39 | 0.89 | 0.19 |
| D20 | 0.99 | 0.40 | 1.13 |

| Aspherical coefficient | | | |
|---|---|---|---|
| R13 | k = −6.92971e−01 | B = −5.71811e−04 | C = 2.13071e−03 |
| | D = −2.02829e−03 | E = 1.09350e−03 | |
| | A' = 0 B' = 0 C' = 0 D' = 0 | | |
| R18 | k = −3.65825e+00 | B = 2.47064e−03 | C = 1.54845e−02 |
| | D = −2.49725e−02 | E = 1.28664e−02 | |
| | A' = 0 B' = 0 C' = 0 D' = 0 | | |

(Numerical Embodiment 2)

| f = 1~9.58 | Fno = 1.85~2.03 | 2ω = 60.6°~7.0° | |
|---|---|---|---|
| R1 = 10.866 | D1 = 0.24 | N1 = 1.846660 | ν1 = 23.9 |
| R2 = 4.636 | D2 = 1.17 | N2 = 1.603112 | ν2 = 60.6 |
| R3 = −27.295 | D3 = 0.04 | | |
| R4 = 3.969 | D4 = 0.71 | N3 = 1.772499 | ν3 = 49.6 |
| R5 = 11.415 | D5 = Variable | | |
| R6 = 10.820 | D6 = 0.14 | N4 = 1.834807 | ν4 = 42.7 |
| R7 = 1.124 | D7 = 0.64 | | |
| R8 = −2.163 | D8 = 0.14 | N5 = 1.513225 | ν5 = 55.6 |
| R9 = 1.580 | D9 = 0.44 | N6 = 1.846660 | ν6 = 23.9 |
| R10 = 8.871 | D10 = Variable | | |
| R11 = 1.567 | D11 = 0.48 | N7 = 1.583126 | ν7 = 59.4 |
| R12 = 12.737 | D12 = 0.24 | | |
| R13 = Stop | D13 = 0.19 | | |
| R14 = 2.351 | D14 = 0.14 | N8 = 1.846660 | ν8 = 23.9 |
| R15 = 1.419 | D15 = 0.48 | | |
| R16 = 3.449 | D16 = 0.37 | N9 = 1.487490 | ν9 = 70.2 |
| R17 = −11.512 | D17 = 0.24 | | |
| R18 = Flare-cut stop | D18 = Variable | | |
| R19 = 2.383 | D19 = 0.81 | N10 = 1.696797 | ν10 = 55.5 |
| R20 = −1.835 | D20 = 0.12 | N11 = 1.846660 | ν11 = 23.9 |
| R21 = −6.931 | D21 = 0.58 | | |
| R22 = ∞ | D22 = 0.54 | N12 = 1.516330 | ν12 = 64.1 |
| R23 = ∞ | | | |

| Variable | Focal length | | |
|---|---|---|---|
| interval | 1.00 | 4.44 | 9.58 |
| D5 | 0.14 | 2.57 | 3.25 |
| D10 | 3.29 | 0.87 | 0.19 |
| D18 | 0.89 | 0.39 | 1.16 |

| Aspherical coefficient | | | |
|---|---|---|---|
| R11 | k = −9.72348e−01 | B = 9.11649e−03 | C = 4.42239e−02 |
| | D = −4.64573e−02 | E = 2.04390e−02 | |
| | A' = 1.41335e−03 | B' = −2.59143e−02 | C' = 6.93066e−03 |
| | D' = 0 | | |
| R16 | k = −8.20862e−02 | B = −9.88884e−03 | C = 1.51432e−02 |
| | D = −1.76805e−02 | E = 7.29444e−03 | |
| | A' = 0 B' = 0 C' = 0 D' = 0 | | |

(Numerical Embodiment 3)

| f = 1~9.57 | Fno = 1.85~2.19 | 2ω = 60.6°~7.0° | |
|---|---|---|---|
| R1 = 10.249 | D1 = 0.24 | N1 = 1.846660 | ν1 = 23.9 |
| R2 = 4.638 | D2 = 1.13 | N2 = 1.603112 | ν2 = 60.6 |
| R3 = −37.507 | D3 = 0.04 | | |
| R4 = 4.121 | D4 = 0.67 | N3 = 1.772499 | ν3 = 49.6 |
| R5 = 12.312 | D5 = Variable | | |
| R6 = 8.356 | D6 = 0.14 | N4 = 1.834807 | ν4 = 42.7 |
| R7 = 1.166 | D7 = 0.59 | | |
| R8 = −2.383 | D8 = 0.12 | N5 = 1.804000 | ν5 = 46.6 |
| R9 = −16.695 | D9 = 0.18 | | |
| R10 = 2.654 | D10 = 0.47 | N6 = 1.846660 | ν6 = 23.9 |
| R11 = −5.273 | D11 = 0.12 | N7 = 1.834807 | ν7 = 42.7 |
| R12 = 4.137 | D12 = Variable | | |
| R13 = Stop | D13 = 0.30 | | |
| R14 = 1.662 | D14 = 0.57 | N8 = 1.693500 | ν8 = 53.2 |
| R15 = 40.528 | D15 = 0.36 | | |
| R16 = 2.899 | D16 = 0.14 | N9 = 1.846660 | ν9 = 23.9 |
| R17 = 1.378 | D17 = 0.48 | | |
| R18 = 3.263 | D18 = 0.36 | N10 = 1.487490 | ν10 = 70.2 |
| R19 = −21.730 | D19 = 0.24 | | |
| R20 = Flare-cut stop | D20 = Variable | | |

-continued

| f = 1~9.57 | Fno = 1.85~2.19 | 2ω = 60.6°~7.0° | |
|---|---|---|---|
| R21 = 2.224 | D21 = 0.70 | N11 = 1.696797 | ν11 = 55.5 |
| R22 = −2.598 | D22 = 0.12 | N12 = 1.846660 | ν12 = 23.9 |
| R23 = −35.660 | D23 = 0.58 | | |
| R24 = ∞ | D24 = 0.54 | N13 = 1.516330 | ν13 = 64.1 |
| R25 = ∞ | | | |

| Variable | Focal length | | |
|---|---|---|---|
| interval | 1.00 | 4.32 | 9.57 |
| D5 | 0.14 | 2.63 | 3.34 |
| D12 | 3.71 | 1.22 | 0.51 |
| D20 | 1.13 | 0.53 | 1.27 |

Aspherical coefficient

| R14 | k = −7.54631e−01 | B = −2.73688e−05 | C = 1.24510e−03 |
|---|---|---|---|
| | D = −1.65729e−04 | E = −1.57400e−04 | |
| | A' = 0  B' = 0  C' = 0  D' = 0 | | |
| R18 | k = −3.39218e+00 | B = 6.69863e−03 | C = 1.73792e−03 |
| | D = −2.65527e−03 | E = 1.03640e−03 | |
| | A' = 0  B' = 0  C' = 0  D' = 0 | | |

(Numerical Embodiment 4)

| f = 1~9.57 | Fno = 1.85~1.99 | 2ω = 60.6°~7.0° | |
|---|---|---|---|
| R1 = 10.541 | D1 = 0.24 | N1 = 1.846660 | ν1 = 23.9 |
| R2 = 4.637 | D2 = 1.15 | N2 = 1.603112 | ν2 = 60.6 |
| R3 = −30.928 | D3 = 0.04 | | |
| R4 = 4.014 | D4 = 0.71 | N3 = 1.772499 | ν3 = 49.6 |
| R5 = 11.750 | D5 = Variable | | |
| R6 = 11.355 | D6 = 0.14 | N4 = 1.834807 | ν4 = 42.7 |
| R7 = 1.129 | D7 = 0.63 | | |
| R8 = −2.226 | D8 = 0.14 | N5 = 1.517417 | ν5 = 52.4 |
| R9 = 1.572 | D9 = 0.45 | N6 = 1.846660 | ν6 = 23.9 |
| R10 = 9.857 | D10 = Variable | | |
| R11 = 1.614 | D11 = 0.48 | N7 = 1.583126 | ν7 = 59.4 |
| R12 = 8.389 | D12 = 0.24 | | |
| R13 = Stop | D13 = 0.25 | | |
| R14 = 2.175 | D14 = 0.14 | N8 = 1.846660 | ν8 = 23.9 |
| R15 = 1.411 | D15 = 0.48 | | |
| R16 = 3.732 | D16 = 0.43 | N9 = 1.583126 | ν9 = 59.4 |
| R17 = −5.220 | D17 = 0.12 | N10 = 1.846660 | ν10 = 23.8 |
| R18 = −9.751 | D18 = 0.24 | | |
| R19 = Flare-cut stop | D19 = Variable | | |
| R20 = 2.444 | D20 = 0.74 | N11 = 1.696797 | ν11 = 55.5 |
| R21 = −2.112 | D21 = 0.12 | N12 = 1.846660 | ν12 = 23.9 |
| R22 = −6.931 | D22 = 0.58 | | |
| R23 = ∞ | D23 = 0.54 | N13 = 1.516330 | ν13 = 64.1 |
| R24 = ∞ | | | |

| Variable | Focal length | | |
|---|---|---|---|
| interval | 1.00 | 4.38 | 9.57 |
| D5 | 0.14 | 2.58 | 3.26 |
| D10 | 3.29 | 0.86 | 0.17 |
| D19 | 0.83 | 0.38 | 1.16 |

-continued

| f = 1~9.57 | Fno = 1.85~1.99 | 2ω = 60.6°~7.0° | |
|---|---|---|---|

Aspherical coefficient

| R11 | k = −1.20743e+00 | B = 1.67551e−02 | C = 4.38874e−02 |
|---|---|---|---|
| | D = −4.90181e−02 | E = 2.32183e−02 | |
| | A' = 1.41334e−03 | B' = −2.59140e−02 | C' = 6.93052e−03 |
| | D' = 0 | | |
| R16 | k = 9.43602e−01 | B = −1.08074e−02 | C = 1.59150e−02 |
| | D = −2.01073e−02 | E = 8.64062e−03 | |
| | A' = 0  B' = 0  C' = 0  D' = 0 | | |

(Numerical Embodiment 5)

| f = 1~9.57 | Fno = 1.85~2.01 | 2ω = 60.6°~7.0° | |
|---|---|---|---|
| R1 = 10.610 | D1 = 0.24 | N1 = 1.846660 | ν1 = 23.9 |
| R2 = 4.621 | D2 = 1.16 | N2 = 1.603112 | ν2 = 60.6 |
| R3 = −30.097 | D3 = 0.04 | | |
| R4 = 4.011 | D4 = 0.71 | N3 = 1.772499 | ν3 = 49.6 |
| R5 = 11.860 | D5 = Variable | | |
| R6 = 11.701 | D6 = 0.14 | N4 = 1.882997 | ν4 = 40.8 |
| R7 = 1.172 | D7 = 0.61 | | |
| R8 = −2.180 | D8 = 0.14 | N5 = 1.518229 | ν5 = 58.9 |
| R9 = 1.644 | D9 = 0.44 | N6 = 1.846660 | ν6 = 23.9 |
| R10 = 12.783 | D10 = Variable | | |
| R11 = 1.548 | D11 = 0.48 | N7 = 1.583126 | ν7 = 59.4 |
| R12 = 8.572 | D12 = 0.24 | | |
| R13 = Stop | D13 = 0.05 | | |
| R14 = 2.237 | D14 = 0.14 | N8 = 1.846660 | ν8 = 23.9 |
| R15 = 1.409 | D15 = 0.72 | | |
| R16 = 3.602 | D16 = 0.53 | N9 = 1.583126 | ν9 = 59.4 |
| R17 = −4.741 | D17 = 0.14 | N10 = 1.805181 | ν10 = 25.4 |
| R18 = −8.206 | D18 = 0.24 | | |
| R19 = Flare-cut stop | D19 = Variable | | |
| R20 = 2.627 | D20 = 0.76 | N11 = 1.696797 | ν11 = 55.5 |
| R21 = −1.906 | D21 = 0.12 | N12 = 1.846660 | ν12 = 23.9 |
| R22 = −6.931 | D22 = 0.48 | | |
| R23 = ∞ | D23 = 0.54 | N13 = 1.516330 | ν13 = 64.1 |
| R24 = ∞ | | | |

| Variable | Focal length | | |
|---|---|---|---|
| interval | 1.00 | 4.29 | 9.57 |
| D5 | 0.14 | 2.57 | 3.26 |
| D10 | 3.29 | 0.86 | 0.18 |
| D19 | 0.89 | 0.42 | 1.23 |

Aspherical coefficient

| R11 | k = −1.23771e+00 | B = 1.86700e−02 | C = 5.09119e−02 |
|---|---|---|---|
| | D = −5.58759e−02 | E = 2.56279e−02 | |
| | A' = 1.41333e−03 | B' = −2.59136e−02 | C' = 6.93038e−03 |
| | D' = 0 | | |
| R16 | k = 5.40518e−01 | B = −8.77131e−03 | C = 7.51739e−03 |
| | D = −9.19106e−03 | E = 3.79417e−03 | |
| | A' = 0  B' = 0  C' = 0  D' = 0 | | |

TABLE 1

|  | Numerical embodiment 1 | Numerical embodiment 2 | Numerical embodiment 3 | Numerical embodiment 4 | Numerical embodiment 5 |
|---|---|---|---|---|---|
| Conditional expression (1) | 70.2 | 70.2 | 70.2 | — | — |
| Conditional expression (2) | — | — | — | 0.156 | 0.197 |
| Conditional expression (3) | 1.068 | 1.001 | 1.175 | 0.892 | 0.803 |
| Conditional expression (4) | 3.502 | 3.422 | 3.359 | 3.511 | 3.386 |
| Conditional expression (5) | 0.136 | 0.139 | 0.142 | 0.136 | 0.211 |

As described above, according to each embodiment, by specifying the minimum lens element of a part of the third lens unit L3, as a lens unit for correcting an image blur when a zoom lens is moved in the direction perpendicular to the optical axis and vibrated (tilted), it is possible to simplify a mechanism, decrease the load of a driving device, decrease the whole system in size and save power. Moreover, by optimizing each lens and a stop configuration, it is possible to realize a zoom lens whose whole length is decreased while preferably correcting the eccentric aberration for shake correction.

Then, an embodiment of a video camera using a zoom lens system of the present invention as an photographing optical system is described below by referring to FIG. 13.

Figure 13:
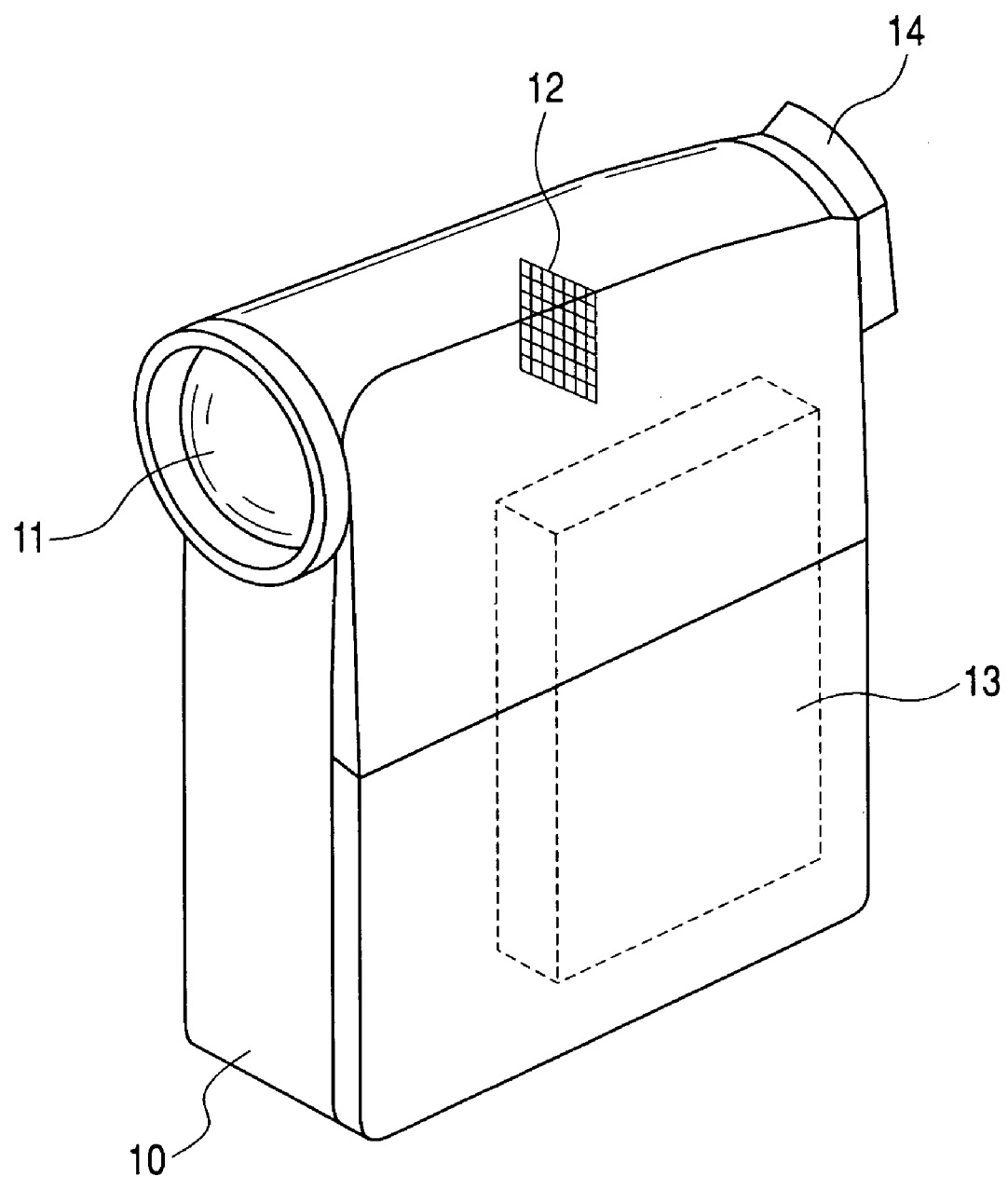
FIG. 13 is a schematic view of an essential portion of a video camera.

In FIG. 13, reference numeral 10 denotes a video camera body, 11 denotes a photographing optical system constituted by a zoom lens of the present invention, 12 denotes a solid-state imaging device (photoelectric transducer) such as a CCD sensor or CMOS sensor for optically receiving an object image by the photographing optical system 11, 13 denotes a memory for storing the object image optically received by the imaging device 12 and 14 denotes a finder for observing an object image displayed on a not-illustrated display device. The display device is constituted by a liquid-crystal panel or the like, on which the object image formed on the imaging device 12 is displayed.

Thus, by applying a zoom lens system of the present invention to an imaging apparatus such as a video camera, it is possible to realize a compact optical apparatus having less ghost or flare and a high optical performance.

This application claims priority from Japanese Patent Application No. 2003-207162 filed Aug. 11, 2003, which is hereby incorporated by reference herein.

What is claimed is:

1. A zoom lens system, in order from the object side to the image side, comprising:
a first lens unit having positive optical power;
a second lens unit having negative optical power; and
a third lens unit having positive optical power which consists of a first lens sub-unit having positive optical power and a second lens sub-unit having positive optical power in order from the object side to the image side;
a fourth lens unit having positive optical power; wherein intervals between the lens units of the zoom lens system change during zooming,
the first lens sub-unit has a positive lens element and a negative lens element and the second lens sub-unit consists of one lens component,
the second lens sub-unit displaces an image formed by the zoom lens system by moving so as to have a component in the direction perpendicular to the optical axis.

2. The zoom lens system according to claim 1, wherein the second lens sub-unit consists of one lens element and the following condition is satisfied, $$63 < v3b$$

where $v3b$ represents the Abbe number of a material constituting the one lens element.

3. The zoom lens system according to claim 1, wherein the second lens sub-unit consists of a cemented lens and the following condition is satisfied, $$0.1 < D3b/f3 < 0.3$$

where $D3b$ represents the thickness of the cemented lens on the optical axis and f3 represents the focal length of the third lens unit.

4. The zoom lens system according to claim 1, wherein the following condition is satisfied, $$0.6 < f3b/f3a < 1.4$$

where $f3a$ and $f3b$ represent focal lengths of the first lens sub-unit and second lens sub-unit, respectively.

5. The zoom lens system according to claim 1, wherein the following condition is satisfied, $$3.0 < f3/fw < 4.0$$

where f3 represents the focal length of the third lens unit and fw represents the focal length of the whole system at the wide angle end.

6. The zoom lens system according to claim 1, wherein the following condition is satisfied, $$0.1 < L3ab/f3 < 0.3$$

where f3 represents the focal length of the third lens unit, $L3ab$ represents the distance on the optical axis from the lens surface of the first lens sub-unit closest to the image side to the lens surface of the second lens sub-unit closest to the object side.

7. The zoom lens system according to claim 1, wherein the second lens sub-unit has an aspherical surface having a shape in which a convergence feature is weakened from the optical axis toward the peripheral.

8. The zoom lens system according to claim 1, wherein the zoom lens system forms an image on a photoelectric transducer.

9. An imaging device comprising:
the zoom lens system of claim 1; and
a photoelectric transducer for optically receiving an image formed by the zoom lens system.

10. A zoom lens system, in order from the object side to the image side, comprising:
a first lens unit having positive optical power;
a second lens unit having negative optical power;
a third lens unit having positive optical power which consists of a first lens sub-unit and a second lens sub-unit in order from the object side to the image side;
a fourth lens unit having positive optical power; wherein intervals between lens units of the zoom lens system change for zooming,
the first lens sub-unit has a plurality of lens elements and an aperture stop disposed in the image side of the lens element closest to the object side among the above lens elements,
the second lens sub-unit displaces an image formed by the zoom lens system by moving so as to have a component in the direction perpendicular to the optical axis.

11. The zoom lens system according to claim 10, wherein the first lens sub-unit and the second lens sub-unit respectively have positive optical power,
the first lens sub-unit has a positive lens element with a convex surface facing object side and a negative lens element with a convex surface facing object side in order from the object side to the image side and the aperture stop is set between the positive lens element and the negative lens element, and
the second lens sub-unit consists of one lens component.

12. The zoom lens system according to claim 10, wherein the following condition is satisfied, $$0.6 < f3b/f3a < 1.4$$

where f3$a$ and f3$b$ represent focal lengths of the first lens sub-unit and the second lens sub-unit, respectively.

13. The zoom lens system according to claim 10, wherein the following condition is satisfied, $$3.0 < f3/fw < 4.0$$

where f3 represents the focal length of the third lens unit and fw represents the focal length of the whole system at the wide angle end.

14. The zoom lens system according to claim 10, wherein the following condition is satisfied, $$0.1 < L3ab/f3 < 0.3$$

where f3 represents the focal length of the third lens unit and L3$ab$ represents the distance from the lens surface of the first lens sub-unit closest to the image side up to the lens face of the second lens sub-unit closest, to the object side on the optical axis.

15. The zoom lens system according to claim 10, wherein the second lens sub-unit has an aspherical surface having a shape in which a convergence feature is weakened from the optical axis toward the peripheral.

16. The zoom lens system according to claim 10, wherein the zoom lens system forms an image on a photoelectric transducer.

17. An imaging device comprising:
the zoom lens system of claim 10; and
a photoelectric transducer for optically receiving an image formed by the zoom lens system.

* * * * *